United States Patent [19]
Chou

[11] Patent Number: 5,675,864
[45] Date of Patent: Oct. 14, 1997

[54] CASTER WITH BRAKE FOR USE IN A MOBILE STRUCTURE

[75] Inventor: Chuon-Hai Chou, Taipei, Taiwan

[73] Assignee: Haion Caster Industrial Co. Ltd., Taipei, Taiwan

[21] Appl. No.: 539,994

[22] Filed: Oct. 6, 1995

[51] Int. Cl.$^6$ .................................................... B60B 33/00
[52] U.S. Cl. ................................................... 16/35 R
[58] Field of Search ...................................... 16/35 R

[56] References Cited

U.S. PATENT DOCUMENTS

| | | | |
|---|---|---|---|
| 3,881,216 | 5/1975 | Fontana | 16/35 R |
| 4,349,937 | 9/1982 | Fontana | 16/35 R |
| 5,012,550 | 5/1991 | Schlösser | 16/35 R |

FOREIGN PATENT DOCUMENTS

| | | | |
|---|---|---|---|
| 394 524 | 10/1991 | Australia | 16/35 R |
| 3426443 | 1/1986 | Germany . | |
| 4128729 | 3/1993 | Germany | 16/35 R |

*Primary Examiner*—Daniel W. Howell
*Assistant Examiner*—Donald M. Gurley
*Attorney, Agent, or Firm*—Leydig, Voit & Mayer, Ltd.

[57] ABSTRACT

A caster includes a support to be secured to a mobile structure. An inverted U-shaped wheel frame has an upper portion and two legs which extend downward from the upper portion. A bearing unit is disposed between the upper portion and the support. A pinion is disposed between the legs beneath the upper portion. A rivet has a shank portion which extends non-rotatably through the support and the pinion and which extends rotatably through the upper portion. A pedal assembly includes two arms and a platform which interconnects front ends of the arms. Each of the arms has a generally S-shaped guide slot that crosses a horizontal guide slot of a corresponding one of the legs. The pedal assembly is flanked by the wheel frame and is mounted pivotally on the latter. A shaft extends into and is movable in the guide slots. A wheel is mounted on the shaft. A brake has two ends which extend through engagement slots in the arms of the pedal assembly. The brake is provided with a rack unit thereon and is movable to result in frictional engagement with the wheel and in engagement between the rack unit and the pinion in response to movement of the shaft.

1 Claim, 7 Drawing Sheets 5,675,864

CASTER WITH BRAKE FOR USE IN A MOBILE STRUCTURE

BACKGROUND OF THE INVENTION

1. Field of the Invention

This invention relates to a caster for a mobile structure, more particularly to a caster which can simultaneously prevent relative rotation of a wheel frame thereof about a vertical axis when a brake of the caster is moved into frictional engagement with the wheel of the caster so as to effectively stop movement of the mobile structure.

2. Description of the Related Art

In German Utility Model Registration No. G9314939.5, published on Feb. 3, 1994, the applicant of the present invention disclosed a caster for use in a mobile structure. Referring to FIGS. 1 and 2, the caster includes a support 10a, an inverted U-shaped wheel frame 20a, a first bearing unit 30a, a pedal assembly 48a, a wheel 50a, a shaft 60a, and a plate-like brake 45a.

The support 10a is to be connected securely to the mobile structure (not shown). The wheel frame 20a has an upper portion 204a which is disposed beneath the support 10a, and two legs 201a which extend downward from two opposite sides of the upper portion 204a. Each of the legs 201a has a horizontal first guide slot 21a formed in a lower section thereof, and a pivot hole Pa formed between the upper portion 204a and the first guide slot 21a. The first guide slots 21a are aligned with each other. The first bearing unit 30a is disposed between the upper portion 204a of the wheel frame 20a and the support 10a so as to permit smooth rotation of the wheel frame 20a relative to the support 10a about a vertical axis. FIG. 3 illustrates the connection between the support 10a and the wheel frame 20a in greater detail. The first bearing unit 30a includes a plurality of ball bearings 301a and a dust protecting ring 302a which confines the ball bearings 301a therein. A friction plate 31a is disposed between the legs 201a of the wheel frame 20a beneath the upper portion 204a. A second bearing unit 15a includes a plurality of ball bearings 151a and a dust protecting ring 152a which confines the ball bearings 151a therein. The second bearing unit 15a is disposed between the upper portion 204a and the friction plate 31a so as to permit smooth rotation of the wheel frame 20a relative to the fiction plate 31a about a vertical axis. A rivet 70a has a cylindrical shank portion which extends through circular holes 100a, 200a, 310a formed respectively in the support 10a, the wheel frame 20a, and the friction plate 31a and which is connected at one end to a washer 16a.

Referring once more to FIGS. 1 and 2, the pedal assembly 40a includes two arms 41a and two platforms 46a, 47a respectively interconnecting the front ends 411a and the rear ends 412a of the arms 41a. Each of the arms 41a has a generally S-shaped second guide slot 42a crossing the first guide slot 21a of a corresponding one of the legs 201a of the wheel frame 20a, a generally vertical engagement slot 431a formed in an upper section 43a thereof, and a pivot hole Pa' formed between the engagement slot 431a and the second guide slot 42a and aligned with the pivot hole Pa of the corresponding leg 201a. Three angularly equidistant engaging holes 414a, 413a, 415a are formed in each of the arms 41a below the pivot hole Pa'. The wheel frame 20a flanks the pedal assembly 40a. A pin Pa" extends through the pivot holes Pa, Pa' so that the pedal assembly 40a is mounted pivotally to the wheel frame 20a. Two engaging tongues 202a, 203a project from the inside wall surface of each of the legs 201a and engage the engaging holes 414a, 415a of the corresponding arm 41a when the caster is in a non-braking state.

The shaft 60a is a tubular body and extends into the first and second guide slots 21a, 42a so that, when one of the platforms 46a, 47a is depressed, the shaft 60a is movable in the first and second guide slots 21a, 42a. The wheel 50a is mounted rotatably on the shaft 60a. A bolt 501a extends through the shaft 60a and engages a nut 502a so as to confine the shaft 60a within the arms 41a of the pedal assembly 40a.

The brake 45a has two ends which extend through the engagement slots 431a in the arms 41a and is movable to result in frictional engagement with the wheel 50a and in frictional engagement with the friction plate 31a in response to movement of the shaft 60a. The legs 201a of the wheel frame 20a encircle the arms 41a of the pedal assembly 40a so that the brake 45a cannot drop from the engagement slots 431a of the pedal assembly 40a.

When the platform 46a of the pedal assembly 40a is depressed, the shaft 60a is shifted from one end 212a of the first guide slots 21a to the other end 211a of the first guide slots 21a, and from the lower end of the second guide slots 42a to the upper end of the second guide slots 42a so that the wheel 50a is moved upward in response to the movement of the shaft 60a. At this time, the brake 45a is shifted toward the wheel 50a in an opposite direction relative to the movement of the wheel 50a. In this way, the brake 45a is capable of being moved into frictional engagement with the friction plate 31a and into frictional engagement with the wheel 50a, thereby achieving an effective braking action. Moreover, the engaging tongues 202a, on the legs 201a of the wheel frame 20a engage the engaging holes 413a, on the arms 41a of the pedal assembly 40a so as to retain the pedal assembly 40a at the braking position. When the platform 47a of the pedal assembly 40a is depressed, the pedal assembly 40a and the wheel 50a are returned to the non-braking position so as to once again permit movement of the mobile structure.

It has been found that, although the wheel 50a can be effectively stopped during braking, the brake 45a is unable to effectively prevent rotation of the wheel frame 20a relative to the support 10a, especially when the caster bears a heavy load, thereby resulting in skidding of the mobile structure.

Referring to FIGS. 4 and 5, another conventional caster for a mobile structure is shown to comprise a support 10b, an inverted U-shaped wheel frame 20b, a bearing unit 30b, a pedal assembly 40b, a shaft 60b, a wheel 50b, and a plate-like brake 25b. The support 10b is to be connected securely to the mobile structure (not shown). The wheel frame 20b has an upper portion which is disposed beneath the support 10b, and two legs which extend downward from two opposite sides of the upper portion. Each of the legs has a horizontal first guide slot 21b formed in the lower section thereof, and a pivot hole 22b formed between the upper portion and the first guide slot 21b. The first guide slots 21b are aligned with each other, and a pin 23b extends through the pivot holes 22b. The bearing unit 30b is disposed between the upper portion of the wheel frame 20b and the support 10b so as to permit smooth rotation of the wheel frame 20b relative to the support 10b about a vertical axis. A pinion 31b is disposed between the legs of the wheel frame 20b beneath the upper portion of the latter and rotates with the support 10b. The brake 25b has a rear end connected pivotally to the pin 23b and a front end formed with a pair of upwardly projecting stop members 250b. The pedal assembly 40b is flanked by the wheel frame 20b and includes two arms 41b and a platform 46b interconnecting the rear ends 411b of the arms 41b. Each of the arms 41b has an upwardly curving second guide slot 42b crossing the first guide slot 21b of a corresponding one of the legs of the wheel frame 20b. The shaft 60b extends into and is movable in the first and second guide slots 21b, 42b. The wheel 50b is mounted on the shaft 60b.

When the platform 46b is depressed, the shaft 60b is shifted from one end 212b of the first guide slots 21b to the other end 211b of the first guide slots 21b, and from the lower end of the second guide slots 42b to the upper end of the second guide slots 42b so that the wheel 50b is moved upward in response to the movement of the shaft 60b, as shown in FIG. 5. At this time, the wheel 50b is moved into frictional engagement with the brake 25b to stop rotation of the wheel 20b, and the brake 25b is forced to pivot upwardly about the pin 23b so that the stop members 250b engage the teeth 310b of the pinion 31b, thereby preventing rotation of the wheel frame 20b relative to the support 10b, as shown in FIG. 6.

In the conventional caster shown in FIGS. 4 to 6, rotation of the wheel frame 20b relative to the support 10b can be prevented upon braking of the wheel 50b due to engagement between the stop members 250b and the pinion 31b. The drawbacks of the conventional caster are as follows:

1. The stop members 250b have limited strength. After prolonged use, the stop members 250b wear easily, especially when the caster bears a heavy load, thereby eventually resulting in the inability of the stop members 250b to engage properly the pinion 31b. When the stop members 250b are unable to engage properly the pinion 31b, the brake 25b is likely to deform due to the upward force applied thereon by the wheel 50b, thereby affecting adversely the braking action on the wheel 50b.

2. Further modifications in the structure of the stop members 250b cannot be performed. Referring to FIG. 5, since the brake 25b is urged upwardly by the wheel 50b during braking, the stop members 250b are also moved upwardly to engage the pinion 31b. Since the teeth 310b are formed around the pinion 31b, the number of stop members 250b on the brake 25b cannot be increased. As shown in FIG. 6, the stop members 250b are arranged along a single line. If a plurality of stop members are to be arranged along a curved line, the stop members have to be manufactured with great precision to ensure that they would be able to engage properly the teeth 310b of the pinion 31b when the brake 25b pivots upwardly. In view of the increased difficulty that is encountered when manufacturing more than two stop members, only two stop members 250b are installed in the conventional caster, thereby resulting in the drawbacks stated beforehand.

SUMMARY OF THE INVENTION

Therefore, the object of the present invention is to provide a caster which is capable of overcoming the aforementioned drawbacks of the prior art.

More specifically, the object of this invention is to provide a caster which can simultaneously prevent relative rotation of a wheel frame thereof about a vertical axis when a brake of the caster is moved into frictional engagement with the wheel of the caster so as to effectively stop movement of the mobile structure.

Accordingly, the caster of the present invention is to be installed on a mobile structure and comprises:

a support adapted to be connected securely to the mobile structure;

an inverted U-shaped wheel frame having an upper portion which is disposed beneath the support and two legs which extend downward from two opposite sides of the upper portion, each of the legs having a horizontal first guide slot formed in a lower section thereof, and a pivot hole formed between the upper portion and the first guide slot;

a bearing unit disposed between the upper portion of the wheel frame and the support;

a pinion disposed between the legs of the wheel frame beneath the upper portion;

a rivet having a shank portion which extends non-rotatably through the support and the pinion and which extends rotatably through the upper portion of the wheel frame;

a pedal assembly which is flanked by the wheel frame and which includes two arms and a platform interconnecting front ends of the arms, each of the arms having a generally S-shaped second guide slot crossing the first guide slot of a corresponding one of the legs, a generally vertical engagement slot formed in an upper section thereof, and a pivot hole formed between the engagement slot and the second guide slot and aligned with the pivot hole of the corresponding one of the legs;

a pin extending through the pivot holes in the wheel frame and the pedal assembly to mount pivotally the pedal assembly to the wheel frame;

a shaft extending into and being movable in the first and second guide slots;

a wheel mounted on the shaft and flanked by the arms of the pedal assembly; and a brake having two ends which extend through the engagement slots in the arms of the pedal assembly, the brake being provided with a rack unit thereon and being movable to result in frictional engagement with the wheel and in engagement between the rack unit and the pinion in response to movement of the shaft from one end of the first guide slot to the other end of the first guide slot when the platform is depressed.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
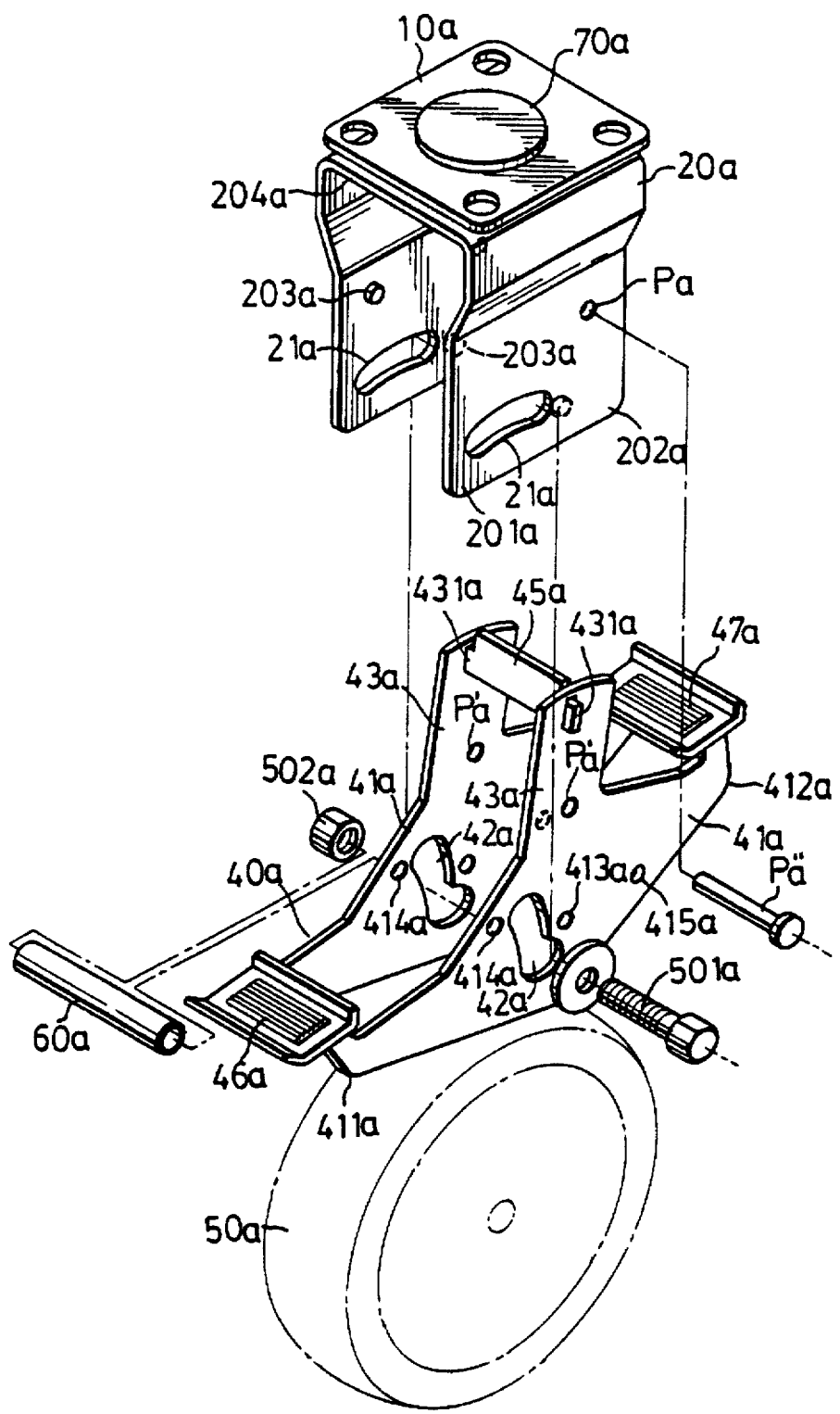
FIG. 1 is an exploded view of a caster disclosed in German Utility Model Registration No. G9314939.5.
Figure 2:
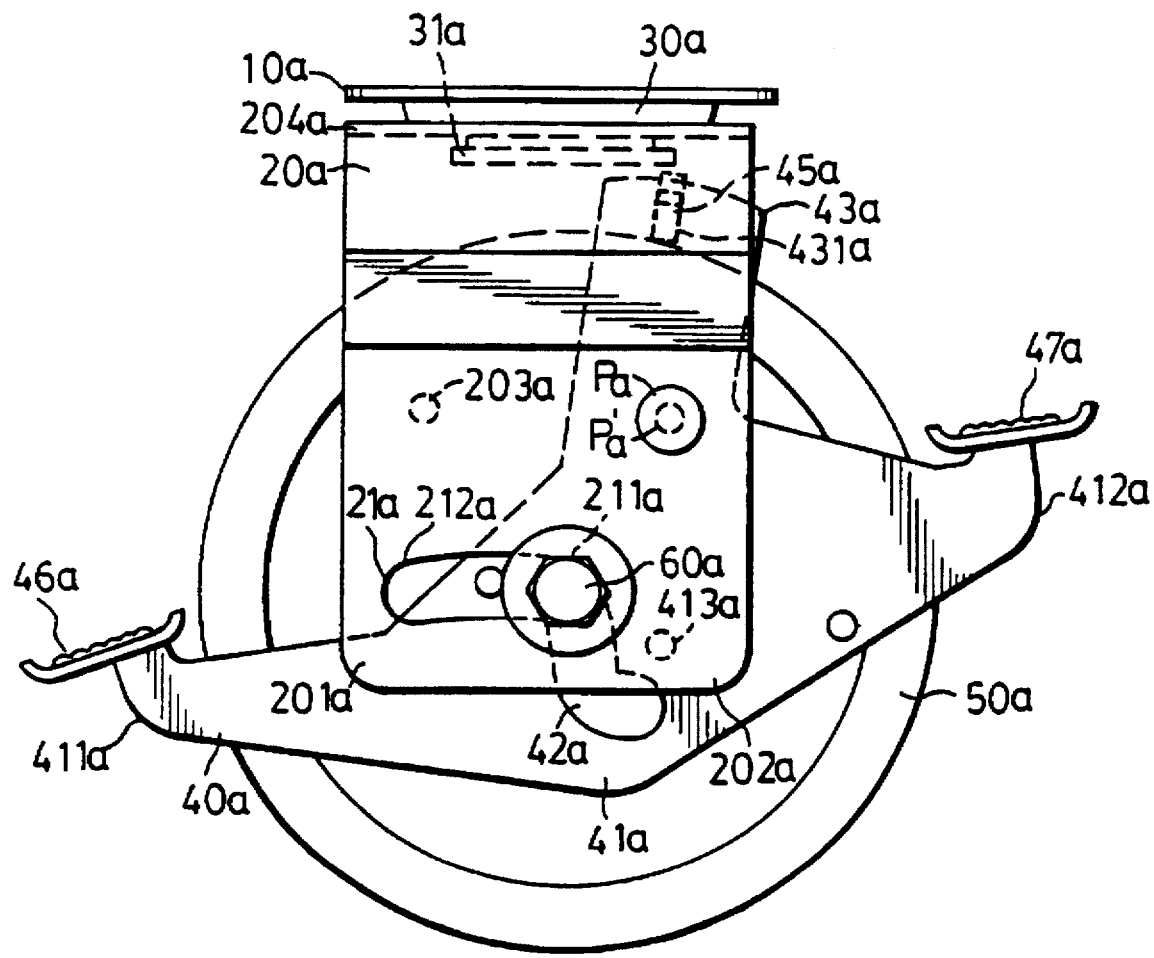
FIG. 2 is a side view of the caster shown in FIG. 1.
Figure 3:
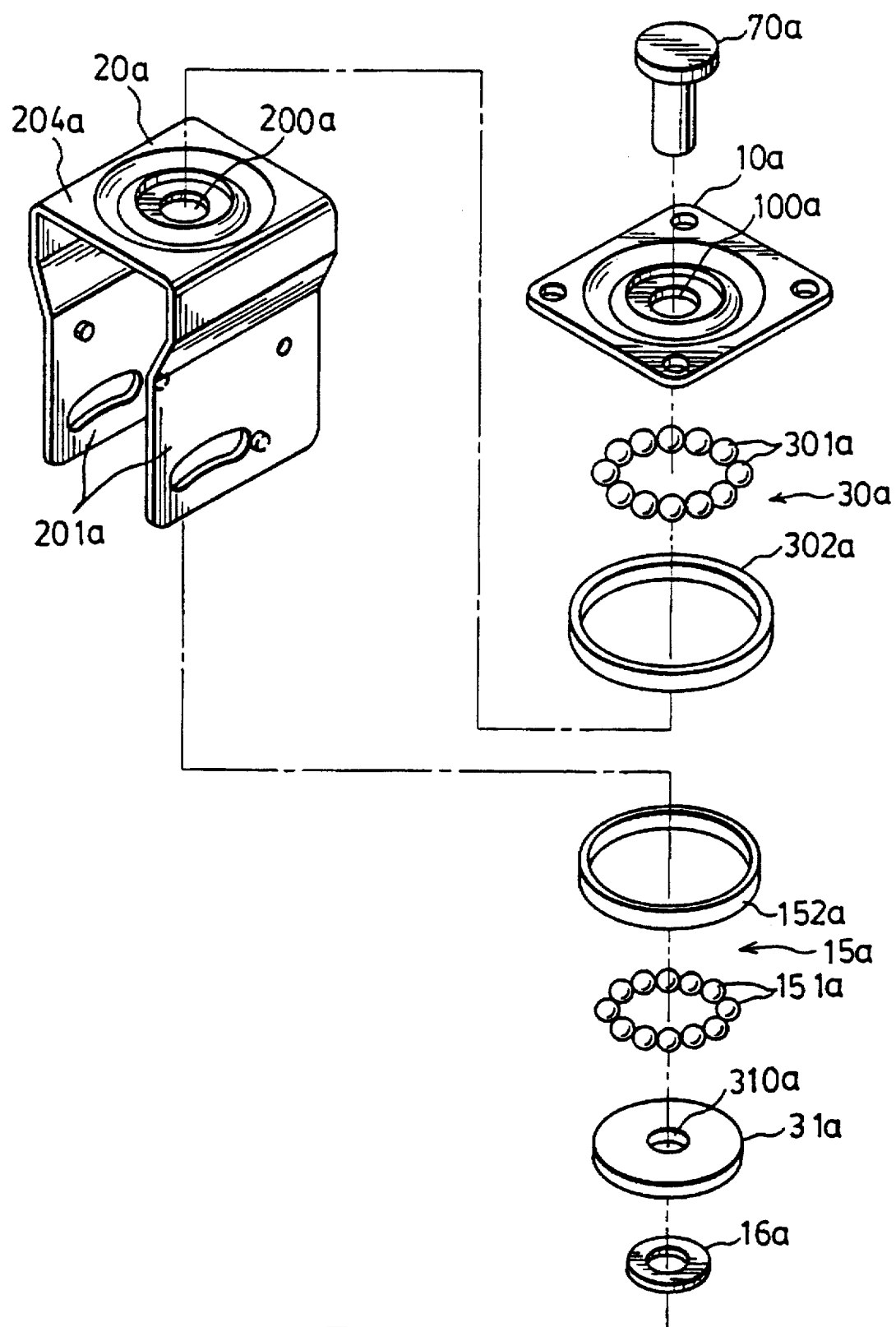
FIG. 3 is an exploded view showing the connection between a support and a wheel frame of the caster shown in FIG. 1.
Figure 4:
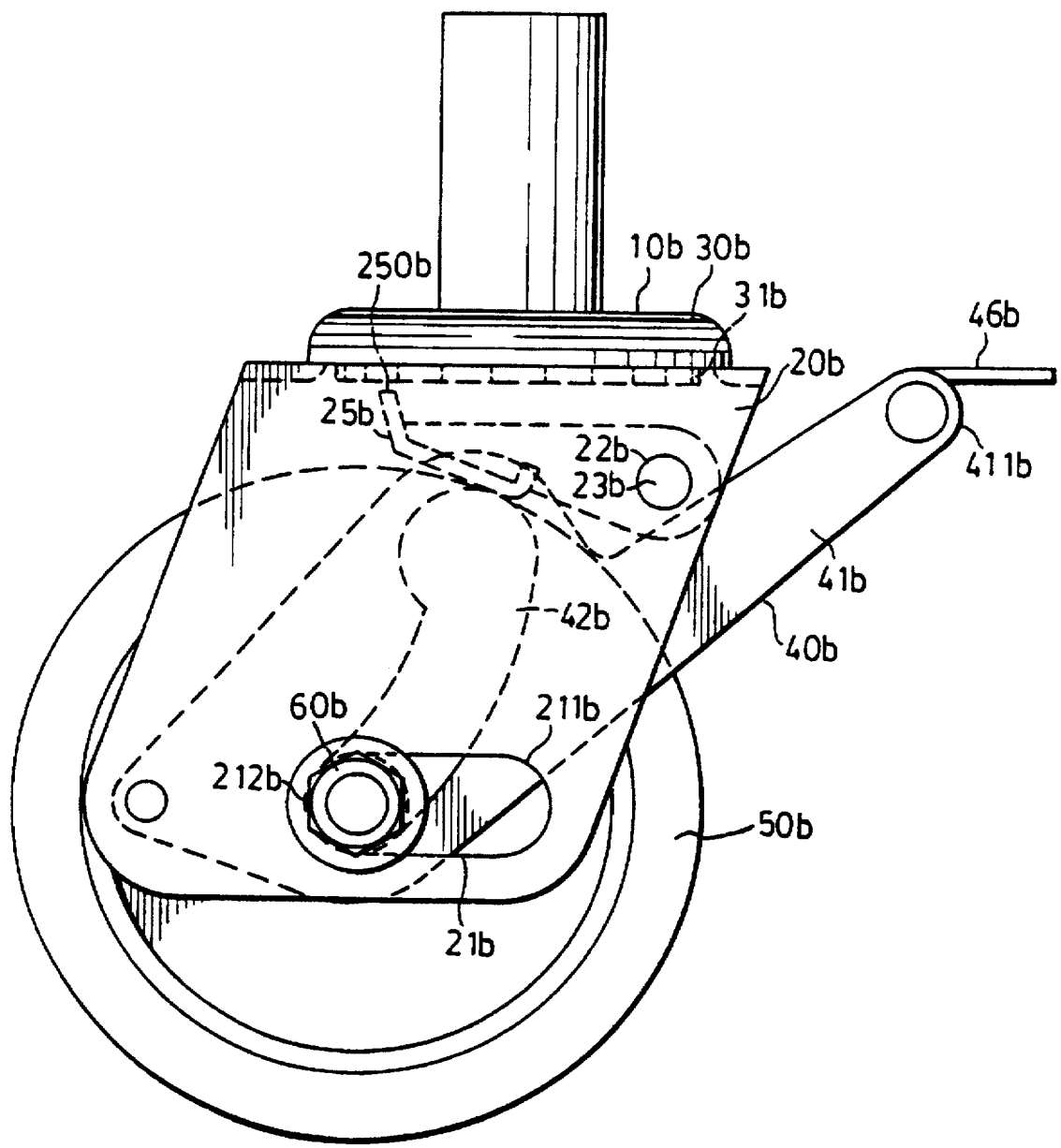
FIG. 4 is a side view of another conventional caster when in a non-braking state.
Figure 5:
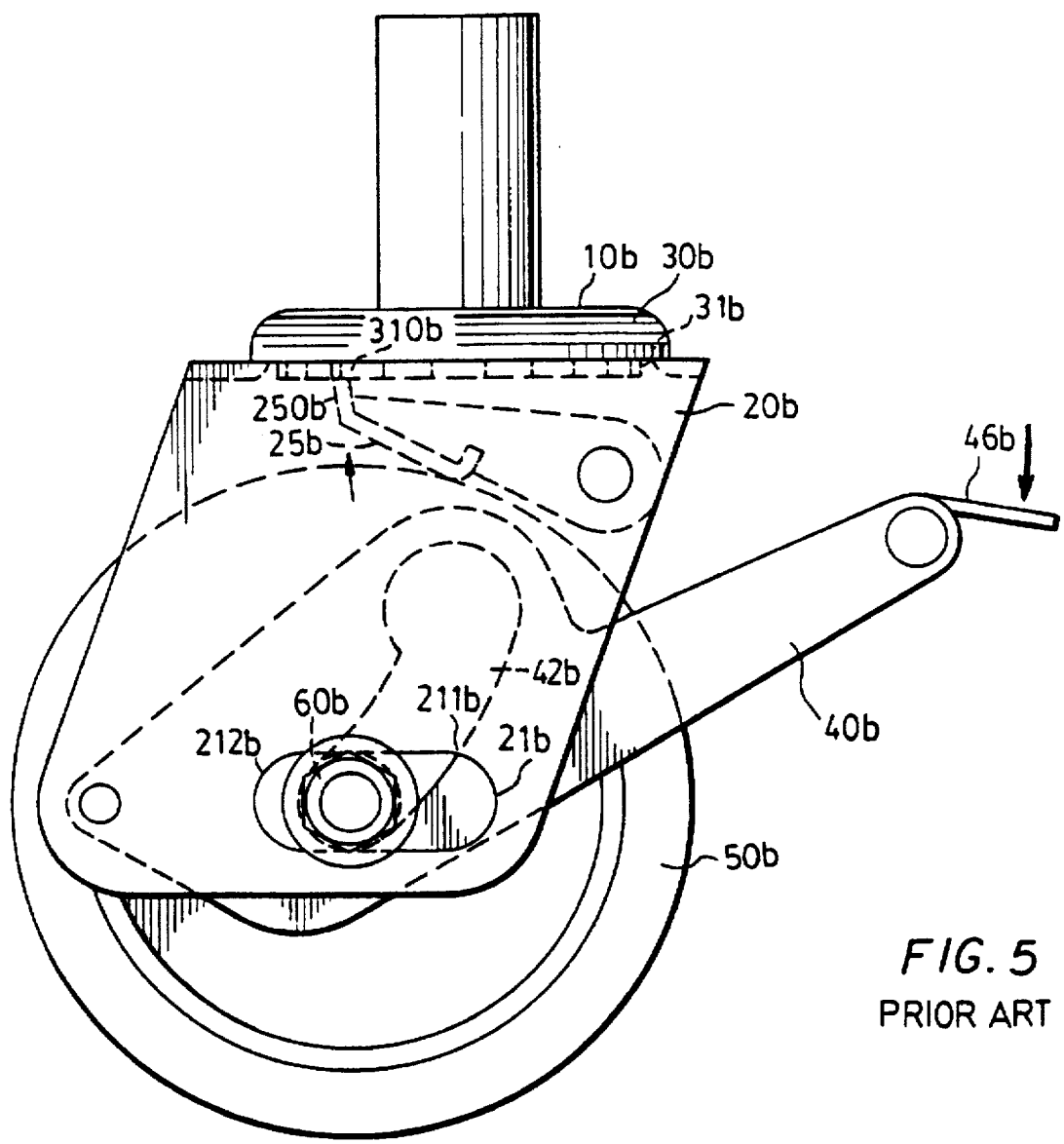
FIG. 5 is a side view of the caster shown in FIG. 4, illustrating the same when in a braking state.
Figure 6:
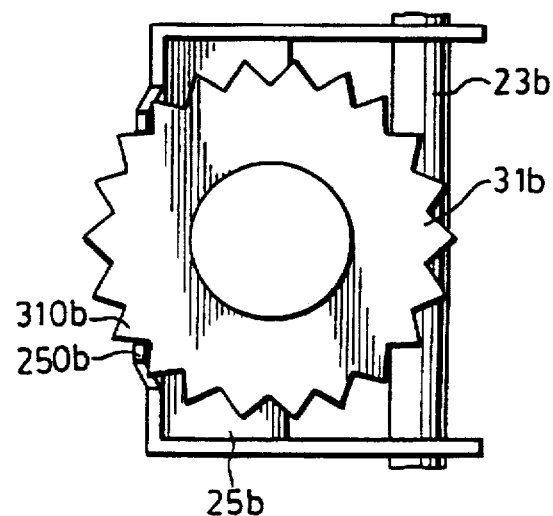
FIG. 6 is a top view illustrating how rotation of a wheel frame is prevented when the caster shown in FIG. 4 is in the braking state.
Figure 7:
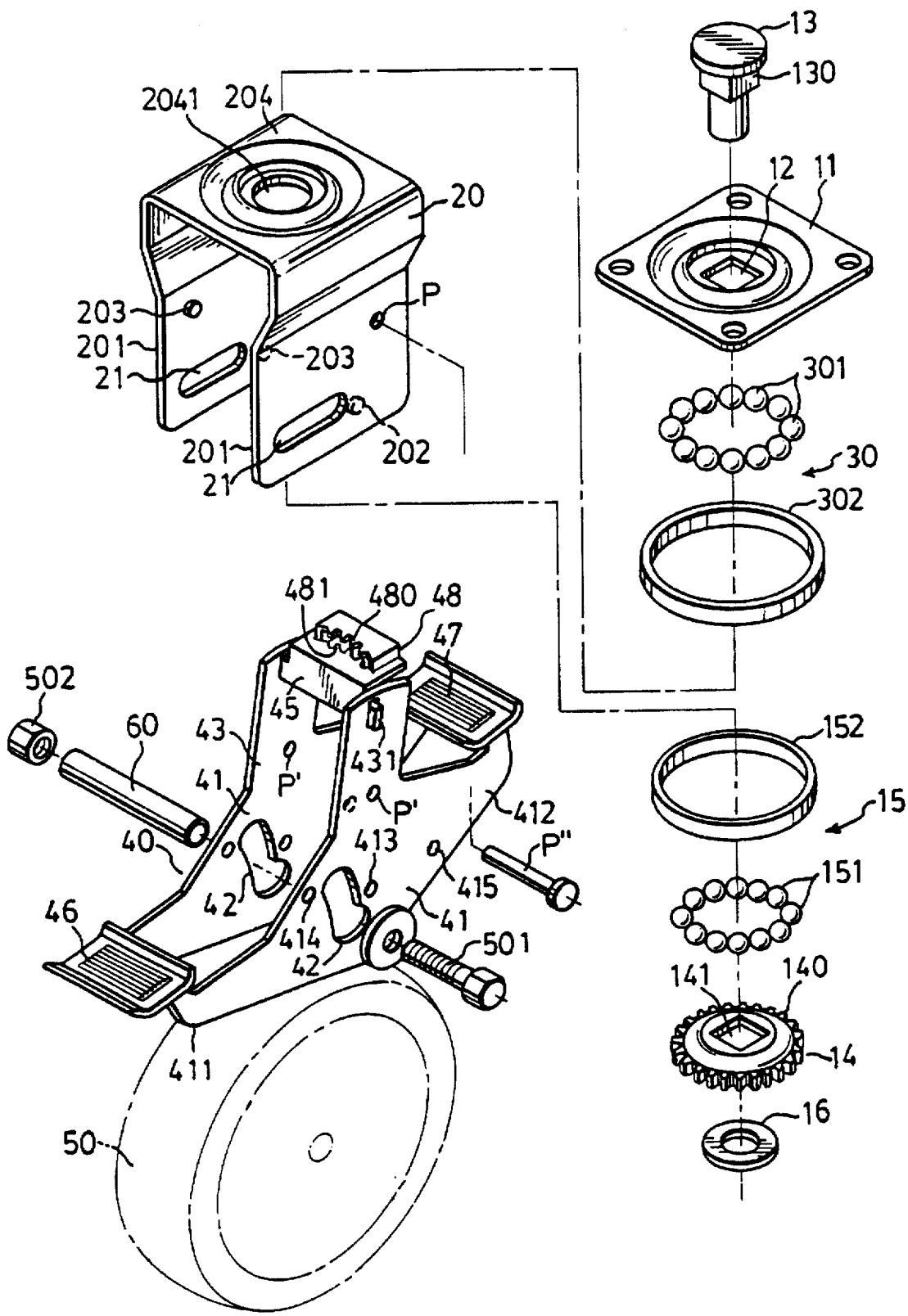
FIG. 7 is an exploded view of the preferred embodiment of a caster according to the present invention.

Referring to FIG. 7, the preferred embodiment of a caster according to the present invention is shown to comprise a support 11, an inverted U-shaped wheel frame 20, a first bearing unit 30, a pedal assembly 40, a wheel 50, a shaft 60, and a plate-like brake 45.

The support 11 is adapted to be connected securely to a mobile structure and is formed with a rectangular through-hole 12. The wheel frame 20 has an upper portion 204 which is formed with a circular through-hole 2041 and which is disposed beneath the support 10, and two legs 201 which extend downwardly from two opposite sides of the upper portion 204. Each of the legs 201 has a horizontal first guide slot 21 formed in the lower section thereof, and a pivot hole P formed between the upper portion 204 and the first guide slot 21. The first guide slots 21 are aligned with each other. The first bearing unit 30 is disposed between the upper portion 204 of the wheel frame 20 and the support 10 so as to permit smooth rotation of the wheel frame 20 relative to the support 10 about a vertical axis. The first bearing unit 30 includes a plurality of ball bearings 301 and a dust protecting ring 302 which confines the ball bearings 301 therein. A pinion 14 is disposed between the legs 201 of the wheel frame 20 beneath the upper portion 204. The pinion 14 is formed with circumferentially arranged teeth 140 and a rectangular through-hole 141. A second bearing unit 15 includes a plurality of ball bearings 151 and a dust protecting ring 152 which confines the ball bearings 151 therein. The second bearing unit 15 is disposed between the upper portion 204 and the pinion 14 so as to permit smooth rotation of the wheel frame 20 relative to the pinion 14 about a vertical axis. A rivet 13 has a shank portion with a rectangular section 130 that engages non-rotatably the through-holes 12, 141 in the support 11 and the pinion 14 and that extends rotatably through the through-hole 2041 in the upper portion 204 of the wheel frame 20, and a circular section 131. A washer 16 is sleeved on the circular section 131, and the circular section 131 is struck to form a second head for the rivet 13, thereby rotatably securing the pinion 14 and the support 11 on the wheel frame 20.

The pedal assembly 40 includes two arms 41 and two platforms 46, 47 respectively interconnecting the front ends 411 and the rear ends 412 of the arms 41. Each of the arms 41 has a generally S-shaped second guide slot 42 crossing the first guide slot 21 of a corresponding one of the legs 201 of the wheel frame 20, a generally vertical engagement slot 431 formed in an upper section 43 thereof, and a pivot hole P' formed between the engagement slot 431 and the second guide slot 42 and aligned with the pivot hole P of the corresponding leg 201. Three angularly equidistant engaging holes 414, 413, 415 are formed in each of the arms 41 below the pivot hole P'. The wheel frame 20 flanks the pedal assembly 40. A pin P" extends through the pivot holes P, P' so that the pedal assembly 40 is mounted pivotally to the wheel frame 20. Two engaging tongues 202, 203 project from the inside wall surface of each of the legs 201 and engage the engaging holes 414, 415 of the corresponding one of the arms 41 when the caster is in a non-braking state.

The shaft 60 is a tubular body and extends into the first and second guide slots 21, 42 so that, when one of the platforms 46, 47 is depressed, the shaft 60 is movable in the first and second guide slots 21, 42. The wheel 50 is mounted rotatably on the shaft 60. A bolt 501 extends through the shaft 60 and engages a nut 502 so as to confine the shaft 60 within the arms 41 of the pedal assembly 40.

The brake 45 has two ends which extend through the engagement slots 431 in the arms 41 and has a rack unit 48 provided thereon. In this embodiment, the rack unit 48 is a plate member that is punched to form upper and lower rows of teeth 480, 481 which are oriented in opposite directions. The brake 45 is movable to result in frictional engagement with the wheel 50 and to result in engagement between the upper row of teeth 480 of the rack unit 48 and the circumferentially arranged teeth 140 of the pinion 14 in response to movement of the shaft 60. The legs 201 of the wheel frame 20 encircle the arms 41 of the pedal assembly 40 so that the brake 45 cannot drop from the engagement slots 431 of the pedal assembly 40.

Figure 8:
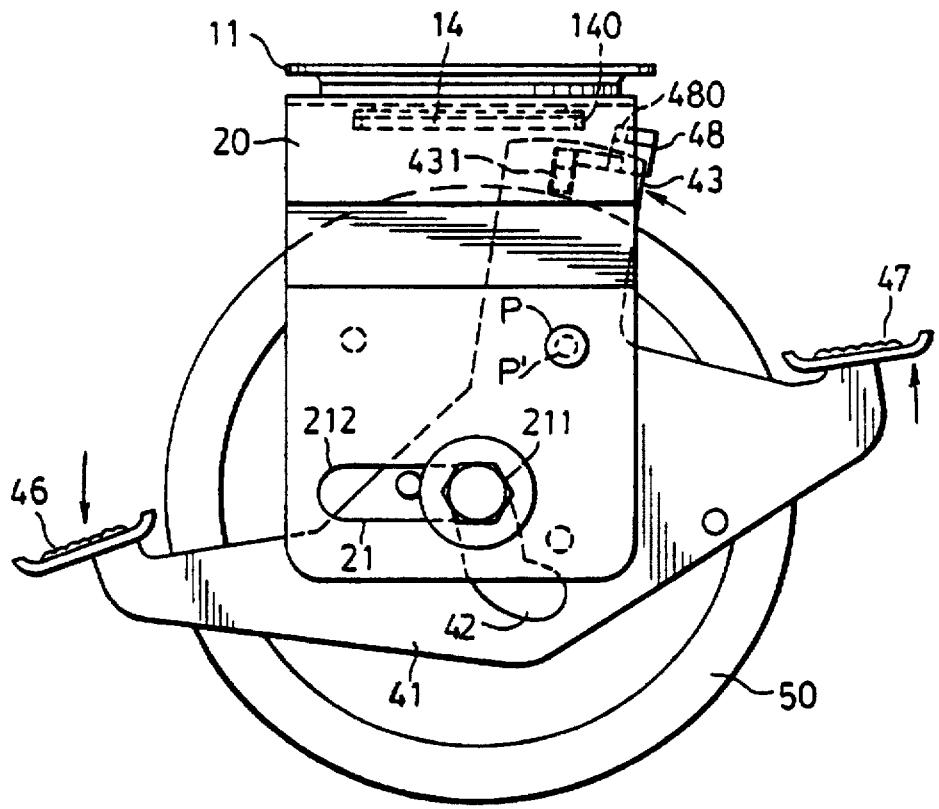
FIG. 8 is a side view illustrating the preferred embodiment when in a braking state.

Referring to FIG. 8, when the platform 46 of the pedal assembly 40 is depressed, the shaft 60 is shifted from one end 212 of the first guide slots 21 to the other end 211 of the first guide slots 21, and from the lower end of the second guide slots 42 to the upper end of the second guide slots 42 so that the wheel 50 is moved upward in response to the movement of the shaft 60. At this time, the brake 45 is shifted toward the wheel 50 in an opposite direction relative to the movement of the wheel 50. In this way, the brake 45 is capable of being moved into frictional engagement with the wheel 50, thereby stopping rotation of the latter. Moreover, the engaging tongues 202, 203 on the legs 201 of the wheel frame 20 engage the engaging holes 413, 414 in the arms 41 of the pedal assembly 40 so as to retain the pedal assembly 40 at the braking position.

Figure 9:
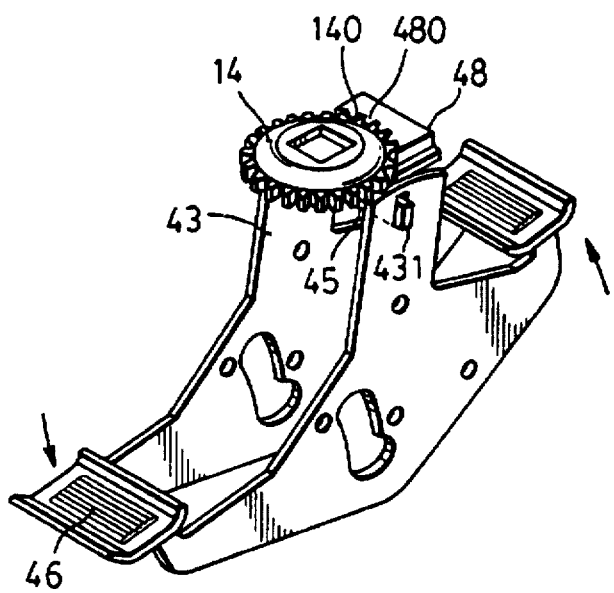
FIG. 9 is a perspective view illustrating how rotation of a wheel frame is prevented when the preferred embodiment is in the braking state.

Referring to FIG. 9, as the pedal assembly 40 pivots about the pin P", the brake 45 travels in a curved path such that the upper row of teeth 480 on the rack unit 48 move toward and engage with the teeth 140 on the pinion 14, thereby arresting rotation of the pinion 14. Referring once more to FIG. 7, since the rivet 13 extends non-rotatably through the pinion 14 and the support 11, the rack unit 48 is also capable of preventing rotation of the support 11. Therefore, relative rotation of the wheel frame 12 is avoided during braking to prevent skidding, regardless of the load carried by the caster. When the platform 47 of the pedal assembly 40 is depressed, the pedal assembly 40 and the wheel 50 are returned to the non-braking position so as to once again permit movement of the mobile structure.

It has thus been shown that the caster of the present invention can simultaneously prevent relative rotation of a wheel frame thereof about a vertical axis when a brake of the caster is moved into frictional engagement with the wheel of the caster so as to effectively stop movement of the mobile structure. The objective of the present invention is thus met.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A caster for a mobile structure, comprising:
   a support adapted to be connected securely to said mobile structure;
   an inverted U-shaped wheel frame having an upper portion which is disposed beneath said support and two legs which extend downward from two opposite sides of said upper portion, each of said legs having a horizontal first guide slot formed in a lower section thereof, and a pivot hole formed between said upper portion and said first guide slot;

a bearing unit disposed between said upper portion of said wheel frame and said support;

a pinion disposed between said legs of said wheel frame beneath said upper portion;

a rivet having a shank portion which extends non-rotatably through said support and said pinion and which extends rotatably through said upper portion of said wheel frame;

a pedal assembly which is flanked by said wheel frame and which includes two arms and a platform interconnecting front ends of said arms, each of said arms having a generally S-shaped second guide slot crossing said first guide slot of a corresponding one of said legs, a generally vertical engagement slot formed in an upper section thereof, and a pivot hole formed between said engagement slot and said second guide slot and aligned with said pivot hole of the corresponding one of said legs;

a pin extending through said pivot holes in said wheel frame and said pedal assembly to mount pivotally said pedal assembly to said wheel frame;

a shaft extending into and being movable in said first and second guide slots;

a wheel mounted on said shaft and flanked by said arms of said pedal assembly; and a brake having two ends which extend through said engagement slots in said arms of said pedal assembly, said brake being provided with a rack unit thereon and being movable relative to the wheel frame about the pin to result in frictional engagement with said wheel and in engagement between said rack unit and said pinion in response to movement of said shaft from one end of said first guide slot to the other end of said first guide slot when said platform is depressed.

* * * * *

UNITED STATES PATENT AND TRADEMARK OFFICE
CERTIFICATE OF CORRECTION

PATENT NO. : 5,675,864
DATED : October 14, 1997
INVENTOR(S) : Chuan-Hai Chow

It is certified that error appears in the above-identified patent and that said Letters Patent is hereby corrected as shown below:

On the title page, item [19], change "Chou" to --Chow--.
Item [75], "Chuon-Hai Chou" should read --Chuan-Hai Chow--.

Signed and Sealed this

Twenty-fourth Day of November,1998

Attest:

BRUCE LEHMAN

Attesting Officer

Commissioner of Patents and Trademarks